US009282427B2

(12) United States Patent
Hill et al.

(10) Patent No.: US 9,282,427 B2
(45) Date of Patent: Mar. 8, 2016

(54) WIRELESS NETWORK DESIGN, COMMISSIONING, AND CONTROLS FOR HVAC, WATER HEATING, AND LIGHTING SYSTEM OPTIMIZATION

(71) Applicant: AMATIS Controls, Inc., Aspen, CO (US)

(72) Inventors: Alex Hill, Aspen, CO (US); Miles Hill, Boulder, CO (US); Melvin Aguirre, Madison, WI (US); Sebastien Gouin-Davis, Carbondale, CO (US)

(73) Assignee: AMATIS CONTROLS, LLC, Aspen, CO (US)

( * ) Notice: Subject to any disclaimer, the term of this patent is extended or adjusted under 35 U.S.C. 154(b) by 0 days.

(21) Appl. No.: 14/212,649

(22) Filed: Mar. 14, 2014

(65) Prior Publication Data

US 2014/0342724 A1 Nov. 20, 2014

Related U.S. Application Data

(60) Provisional application No. 61/794,717, filed on Mar. 15, 2013, provisional application No. 61/794,437, filed on Mar. 15, 2013.

(51) Int. Cl.
| | |
|---|---|
| *H04M 3/00* | (2006.01) |
| *H04W 4/02* | (2009.01) |
| *H04W 16/18* | (2009.01) |
| *H04W 4/06* | (2009.01) |

(Continued)

(52) U.S. Cl.
CPC ............ *H04W 4/02* (2013.01); *H04L 41/145* (2013.01); *H04W 16/18* (2013.01); *H04L 41/0253* (2013.01); *H04L 41/22* (2013.01); *H04L 43/10* (2013.01); *H04L 61/103* (2013.01); *H04L 61/2007* (2013.01); *H04L 61/6022* (2013.01); *H04L 61/6059* (2013.01); *H04W 4/06* (2013.01); *Y02B 60/50* (2013.01)

(58) Field of Classification Search
CPC ......... H04W 4/02; H04W 4/06; H04W 16/18; Y02B 60/50; H04L 41/0253; H04L 61/103; H04L 61/6059; H04L 41/145; H04L 43/10; H04L 41/22; H04L 61/6022; H04L 61/2007
USPC .................................................. 370/346, 449
See application file for complete search history.

(56) References Cited

U.S. PATENT DOCUMENTS

| | | | | |
|---|---|---|---|---|
| 4,940,974 | A | * | 7/1990 | Sojka ........................... 340/10.2 |
| 5,297,144 | A | * | 3/1994 | Gilbert et al. ................. 370/346 |

(Continued)

*Primary Examiner* — Ajit Patel
(74) *Attorney, Agent, or Firm* — Kilpatrick Townsend & Stockton LLP

(57) ABSTRACT

Methods, devices, and systems for commissioning and programming a network of wireless devices are disclosed herein. These can include utilizing a commissioning tool having a directional radio frequency antenna, a microprocessor, and memory. The commissioning tool can function with a Smartphone, or be a stand-alone device. The commissioning tool can program wireless devices without direct physical access or direct line-of-sight from the commissioning tool to the device. The commissioning tool can establish network connections with a "query," "wink," "ping" protocol, connecting devices that control HVAC, water heating, and lighting systems wirelessly with a border router that can be for upload data collected by devices to the Internet. The method can also include collection, analysis, and illustrations of building system performance data on web-based software.

12 Claims, 21 Drawing Sheets

(51) Int. Cl.
*H04L 12/24* (2006.01)
*H04L 29/12* (2006.01)
*H04L 12/26* (2006.01)

(56) References Cited

U.S. PATENT DOCUMENTS

| | | | | |
|---|---|---|---|---|
| 5,621,735 | A * | 4/1997 | Rochester et al. | 370/346 |
| 6,515,970 | B1 * | 2/2003 | Lindsay et al. | 370/280 |
| 7,991,409 | B2 * | 8/2011 | Qi et al. | 455/458 |
| 2006/0023679 | A1 * | 2/2006 | Twitchell, Jr. | H04Q 9/00 370/338 |
| 2012/0115503 | A1 * | 5/2012 | Lynch | H04L 67/16 455/456.1 |
| 2012/0157121 | A1 * | 6/2012 | Li et al. | 455/456.2 |
| 2013/0188515 | A1 * | 7/2013 | Pinheiro et al. | 370/254 |
| 2013/0281110 | A1 * | 10/2013 | Zelinka | 455/456.1 |
| 2014/0235265 | A1 * | 8/2014 | Slupik | H04W 4/02 455/456.1 |
| 2014/0253093 | A1 * | 9/2014 | Bermudez Rodriguez et al. | 324/76.11 |

* cited by examiner

Figure 10A, 10B, & 10C
(10A) Background Schematic Layer
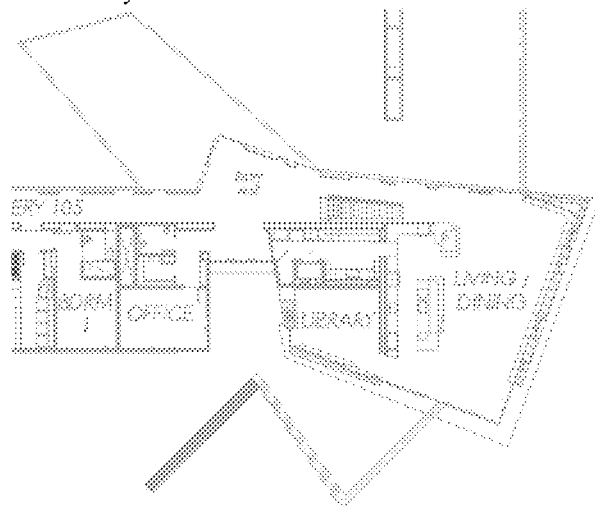
(10B) Cooling Layer:
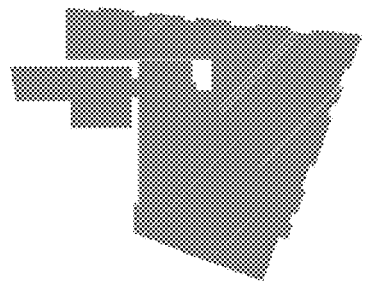
(10C) Background + Cooling Layer
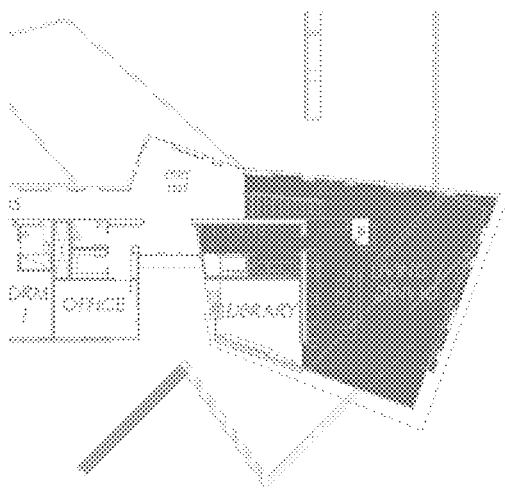

WIRELESS NETWORK DESIGN, COMMISSIONING, AND CONTROLS FOR HVAC, WATER HEATING, AND LIGHTING SYSTEM OPTIMIZATION

CROSS-REFERENCES TO RELATED APPLICATIONS

This patent application claims the benefit of U.S. Provisional Patent Application No. 61/794,717, filed on Mar. 15, 2013, and entitled "Wireless Network Design and Control," and U.S. Provisional Patent Application No. 61/794,437, filed Mar. 15, 2013, and entitled "Water Heating System Optimization," the entirety of both of which are incorporated by reference herein.

BACKGROUND OF THE INVENTION

Embodiments disclosed herein relate to 6LoWPAN wireless communication between devices that meter, monitor, and control HVAC, water heating, and lighting systems. The term 6LoWPAN is a radio frequency communications standard, which stands for Internet Protocol 6 over Low power Wireless Personal Area Networks. The term HVAC stands for heating, ventilation, and air conditioning systems. 6LoWPAN wireless communication networking for energy meters, energy monitors, and control devices allow building management systems to connect to the Internet, giving users access to detailed data and remote control of mechanical and electronic systems. Capability for detailed data analysis and the ability for programmable smart building systems create significant opportunities to reduce energy usage, maximize energy efficiency, and optimize system performance of HVAC, water heating, and lighting systems.

BRIEF SUMMARY OF THE INVENTION

The systems, devices, and methods disclosed herein each have several aspects, no single one of which is solely responsible for their desirable attributes. Without limiting the scope of the claims, some prominent features will now be discussed briefly. Numerous other embodiments are also contemplated, including embodiments that have fewer, additional, and/or different components, steps, features, objects, benefits, and advantages. The components, aspects, and steps may also be arranged and ordered differently. After considering this discussion, and particularly after reading the section entitled "Detailed Description of Certain Embodiments," one will understand how the features of the devices and methods disclosed herein can provide advantages over other known devices and methods.

Some embodiments relate to a method of commissioning and programming a network of wireless devices. The method of commissioning wireless devices can include, for example, utilizing a commissioning tool with a directional radio frequency antenna, microprocessor, and computer memory designed to function with a Smartphone, or in a stand-alone device, able to program wireless devices without physical access to the device or line-of-sight from the tool to the device. In some embodiments, the commissioning tool establishes network connections with a "query," "wink," "ping" protocol, connecting devices that control HVAC, water heating, and lighting systems wirelessly with a border router that is responsible for uploading data collected by devices to the Internet. Some embodiments of this method can further include collection, analysis, and illustrations of building system performance data on web-based software.

One embodiment of the present disclosure relates to a method of commissioning networks of wireless device. The method includes generating a device query, that can include a request for device information, broadcasting the device query, and receiving a first query response that can include first device information for a first wireless device within a network. In some embodiments, the first device information identifies an aspect of the first wireless device. The method can include receiving a second query response including first device information for a second wireless device within a network, which second device information identifies an aspect of the second wireless device, selecting the first wireless device, and generating a first wink message. In some embodiments, the first wink message includes instructions for a receiving device to provide a visible indicator of receipt of the first wink message. The method can include, for example, transmitting the first wink message to the first wireless device, receiving location information for the first wireless device, which location information can identify the location of the first device, and associating the location information with the first wireless device.

In some embodiments, the method can include selecting the second wireless device, generating a second wink message, which includes instructions for a receiving device to provide a visible indicator of receipt of the second wink message, transmitting the second wink message to the second wireless device, receiving location information for the second wireless device, and associating the location information with the second wireless device.

In some embodiments, the first device information uniquely identifies the first device, identifies a function of the first device, the commissioning tool broadcasts a query via a directional antenna, and the query broadcast is transmitted initially at a first power, and based on the received query responses, the broadcasted query message is rebroadcasted with a transmission at a second power.

In some embodiments, commissioning devices include an antenna configured to broadcast and receive information; a processor, which processor generates a device query. In some embodiments, the device query requests information from a device. The device query can be transmitted from a directional antenna and the antenna can receive a first query response including device information for a first wireless device within a network, which first query response identifies an aspect of the first wireless device. In some embodiments, a second query response, including information for a second wireless device within a network, identifies information on an aspect of the second wireless device.

In some embodiments, the commissioning tool selects the first wireless device; the microprocessor generates a first wink message; the first wink message instructs the receiving device to provide a visible indicator of receipt of the first wink message; the wink message is transmitted by the directional antenna to the first wireless device, and location information for the first wireless device is communicated with a visible indicator of receipt of the wink message. In some embodiments, the commissioning tool requests storing information provided by the device in computer memory designed to store information associating the device location information with the wireless device.

In some embodiments of the device, the processor selects the second wireless device; generates a second wink message, which includes instructions for a receiving device to provide a visible indicator of receipt of the second wink message; transmits the second wink message to the second wireless device; receives location information for the second wireless device; and associates the location information with the second wireless device.

In some embodiments, the first device information uniquely identifies the first device and identifies a function of the first device. Certain embodiments include an antenna that is a directional antenna able to broadcast at a first power and able to rebroadcast at a second power based on the received query responses.

BRIEF DESCRIPTION OF THE DRAWINGS

FIGS. 10A-10C illustrates drawings generated with computer-assisted design (CAD). Layers of the CAD drawings can be turned on or off to display all or part of the drawing. FIG. 10A shows a full background CAD floor plan. FIG. 10B shows only the layer displayed signifying a space that is being actively cooled. And FIG. 10C shows the background floor plan layered simultaneously with the cooling layer. This way, images are created that can be quickly visualized and understood. If the floor area is colored blue then cooling is active in this space. A custom program exports images as transparent portable network graphic (PNG) files, including each layer as an individual PNG file. Because PNG files are typically smaller this method ensures that all the PNG files may be managed by mobile Smartphone, tablets, and web-based software. An animated folder is tagged to the state of the living room thermostat. If active cooling is "OFF" FIG. 10A is displayed; and if active cooling is "ON" FIG. 10C is displayed.

DETAILED DESCRIPTION

Commissioning 6LoWPAN Devices Wirelessly via Narrow Radio Frequency Transmission For wireless building management systems to operate effectively, switches and controllers must be able to deliver precise messages to specific devices. To accomplish this task, each device must be uniquely identifiable within a network. The process of uniquely identifying devices in a network is called commissioning. This novel method of commissioning networks of 6LoWPAN electronic devices via radio frequency does not require physical access or line of sight to the node.

This commissioning method is executed with a commissioning tool manufactured as a stand-alone product or a hardware attachment for Smartphones and mobile devices such as the Apple iPad or other computer tablets. The commissioning technique allows nodes in an office environment, such as lighting controls and HVAC controls, often located above a suspended ceiling, to be commissioned without removing ceiling tiles and without direct line of sight to the node. Radio frequency is able to pass through walls and suspended ceilings and therefore is able to connect to the various nodes.

Existing building control systems are commissioned in a variety of ways. Currently, commissioning occurs by means of the four following methods:

1) Infrared or Laser—Infrared or laser commissioning processes demand a clear line of sight to the targeted node. The disadvantages of this process are that, each device must be fitted with an infrared or laser receiver, and the installer must be able to see the device and target the devices' receivers. This is often not possible when controls are installed above a suspended ceiling or hidden in electric panel boxes.

2) Push button—With this mode, each device has a push button fitted to the fixture. When pressed, this button identifies the device to network management tools, which then gives the device a unique network label. This process requires physical access to each device. This adds time and complexity to the installation process.

3) Power-up—This method requires that each device be powered up in a sequential fashion. Disadvantages of this approach include time demands and difficulty maintaining a methodical process over significant square footage in a busy construction environment where exact sequential power-ups are required.

4) Search and identification via binary search techniques—In this mode, a network management tool seeks out the IP address for every device. Upon finding the device, the tool sets it to blink. The installer must then walk around the building until the flashing light is located. The installer must then make note of the node's location on the network management software. The disadvantage of this method is that all nodes must be completely installed and functioning to be properly commissioned. This method is a very slow and tedious process for installers.

Figure 1:
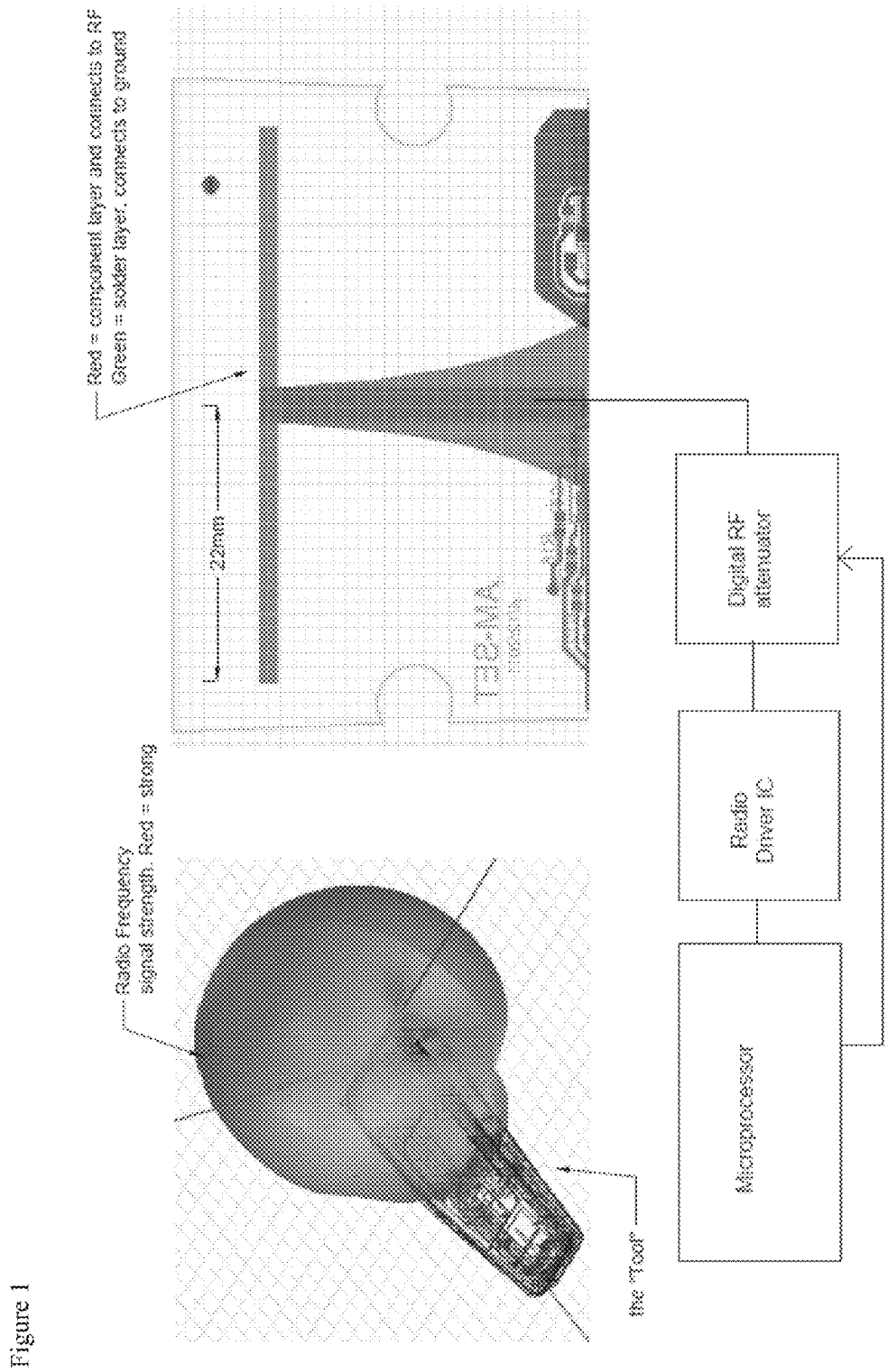
FIG. 1 illustrates the design of one embodiment of the commissioning tool and its functions. This schematic details the design of the antenna on a printed circuit board (PCB) and displays an image of the radio signal strength around the antenna showing the unique unipolar design.

The 6LoWPAN radio frequency commissioning tool offers a novel alternative. The commissioning tool functions like a point and click device, transmitting a narrow radio frequency beam in the direction of devices installed throughout a building. This tool has an embedded radio antenna small enough to attach to a Smartphone or it can be built into a handheld device. The antenna is designed on a printed circuit board. Its unique design and shape produce a focused radio beam transmitting the majority of the energy in a single direction (see FIG. 1).

In order to select an individual device for programming the directional radio beam acts as a pointer. Each device to be commissioned has embedded hardware enabling two-way radio frequency communication that detects the narrow radio beam transmitted by the commissioning tool.

When an installer points the tool at a targeted device (e.g. a light switch) the microprocessor inside the tool sets the radio frequency attenuator to the lowest signal strength and sends out a query message. The query message begins with the lowest energy data pulse. If, after a short delay, the tool does not receive a response, it boosts the signal strength by degrees and sends out another message. Eventually the signal is strong enough for the intended device to receive. Because it is possible for more than one device to receive the message, the antenna's digitally controlled radio frequency attenuator can produce between 50-70 decibels of attenuation helping single-out devices. If more than one device responds at the same time, the tool's display screen will show both devices and allow the installer to select one device at a time.

This tool employs a "query," "wink," "ping" protocol to identify an individual device. The tool will transmit a query message via directional radio frequency. When the query message reaches the targeted device, the device responds by "winking" A "wink" is a way for the device to identify itself. For example, a light fixture would turn on or off, and an HVAC controller would turn a fan on or off. This is an effective way for the installer to verify they have identified the correct device. The device can also send a message back to the commissioning tool to be displayed on the display screen. The installer verifies the intended device by pressing the "Accept" button on the display. Pressing "Accept" instructs the winking device to send out a "ping" message to the network management software via the 6LoWPAN network. The "ping" message carries a unique alphanumeric identification number related to its specific IP6 address. The installer is now able to label the device with a recognizable name or location within the network. The installer can also choose a default programming based on the type of room the devices are controlling. For example, in one embodiment the installer may choose "Open Office" to set all devices commission in that space to operate with default "open office" settings. Other default programs could include, closed office, hallway, parking garage, break room, etc. Upon confirmation of the ping, the device stops winking and reverts to its original state or a predetermined state chosen with the commissioning tool. The default state for all devices is "ON" to be sure that the installer can confirm their work is completed. A fully commissioned node can be instructed to end the commissioning procedure by turning off or being dimmed, giving the programmer a visual record of devices yet to be commissioned.

Using a combination of a directional radio antenna and a variable radio frequency attenuator, this commissioning tool presents a novel and unique method to program individual electronic devices in a wireless network. Because traditional methods require that devices are either in the line of sight or physically accessed commissioning a large building could require difficult access to devices using ladders, remove ceiling tiles, and opening electric panel boxes. This tool allows commissioning that is safer, quicker, and less expensive than other methods.

Figure 2:
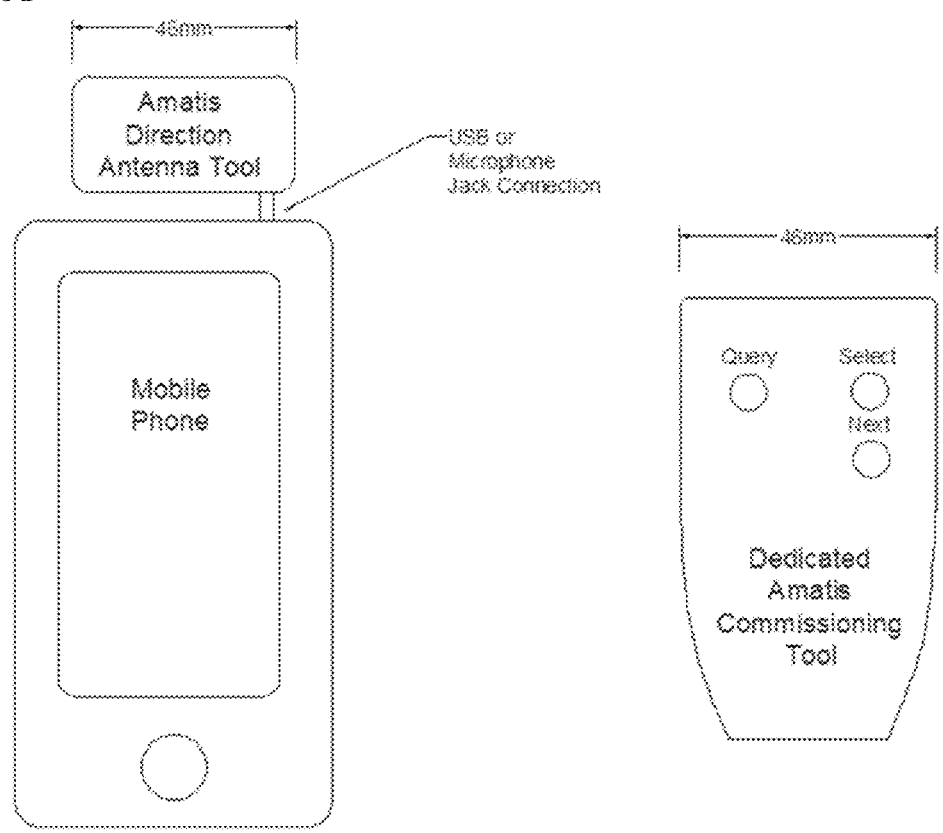
FIG. 2 illustrates two embodiments of the commissioning tool either as an attachment to a Smartphone (left) or as a dedicated stand-alone commissioning tool (right).
Figure 8:
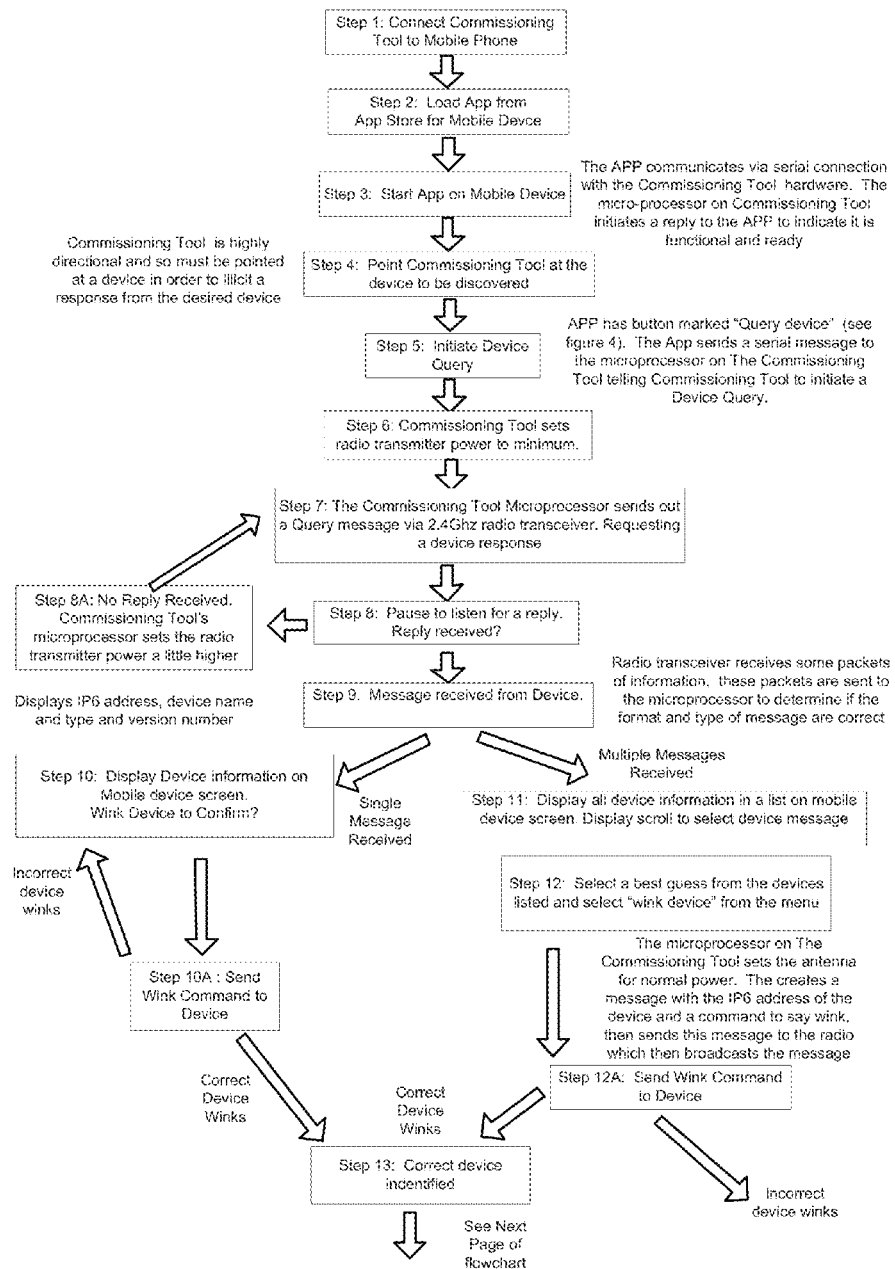
FIG. 8 is a flow chart illustrating one embodiment of the commissioning tool designed to work with a Smartphone or tablet with a corresponding mobile application. In this example, the commissioning tool is designed to work with a Smartphone and the first steps of this flow chart describe fitting the hardware as an extension to the Smartphone input port. (In other embodiments, the commissioning tool is housed in a stand-alone device with a display and would follow a similar flow chart starting at Step 4.) The step-by-step description of this flow chart is below.
Figure 8:
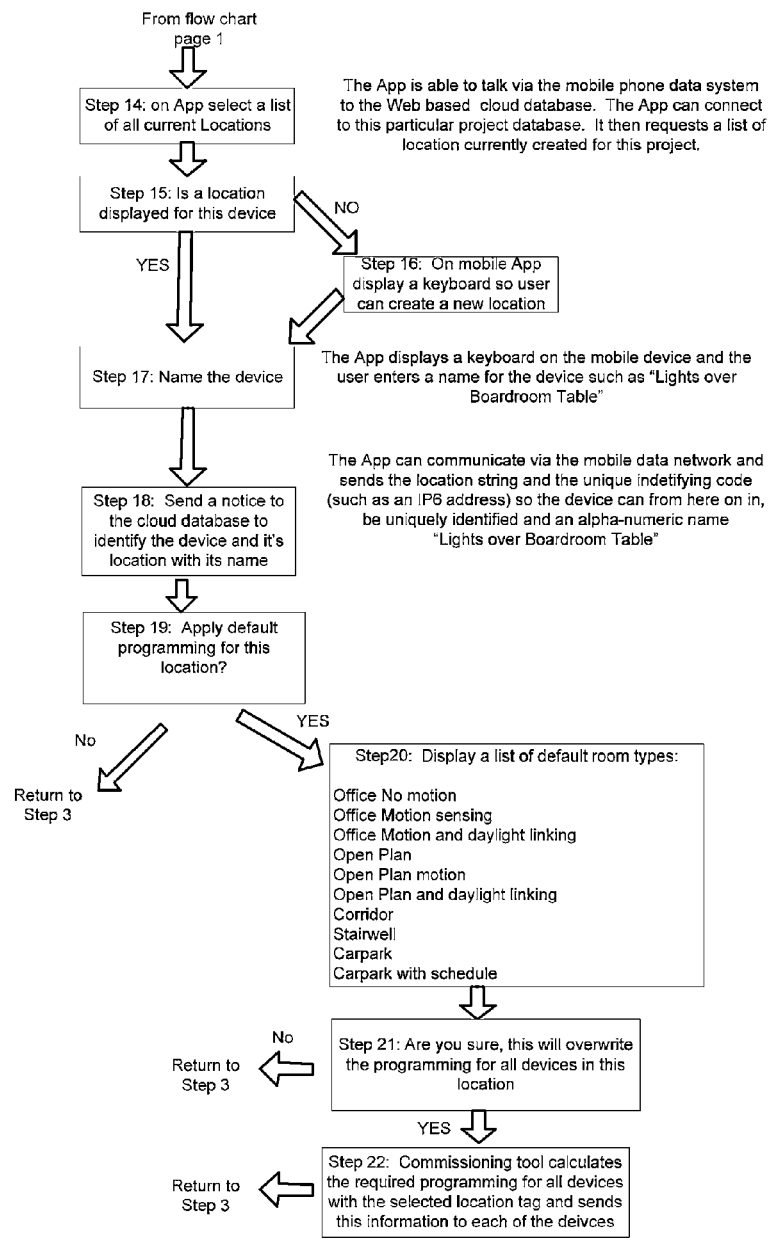
Figure 9:
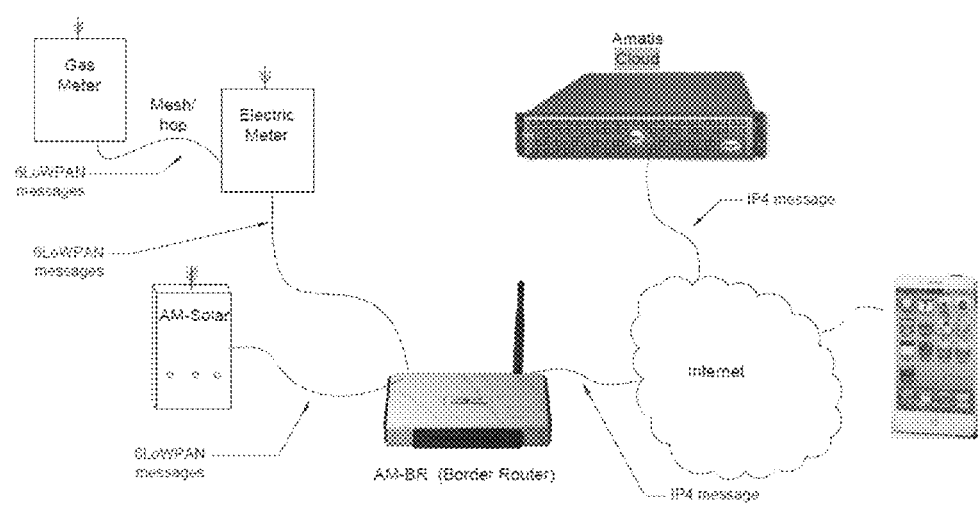
FIG. 9 illustrates an example of a 6LoWPAN Network map including meters and controllers communicating wirelessly with the border router. Uploading data to the Internet occurs via IP4 communication protocol. Data is accessible via web-based software, in this example, from a mobile Smartphone.
Figure 11:
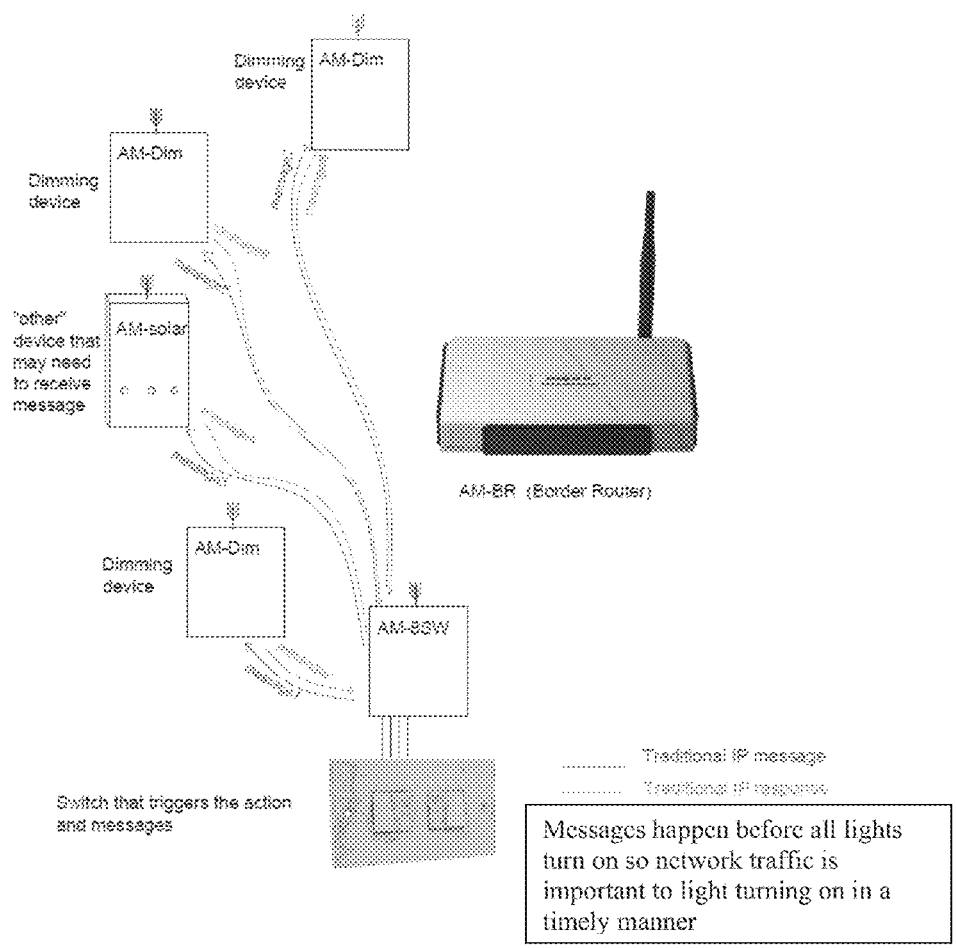
FIG. 11 illustrates a traditional peer-to-peer 6LoWPAN communication protocol where a switch/controller sends messages (red lines) to individual devices. In this conventional method, each device sends an acknowledgment message (green lines) back to the controller.

With reference now to FIG. 8, a flowchart illustrating one embodiment of a process of commissioning a wireless device is shown. The process can be performed by the commissioning tool. The process begins at Step 1: wherein the commissioning tool prepared, and in some embodiments is fitted to a Smartphone or mobile tablet by connecting to the serial data port or headphone jack (See FIG. 2).

Step 2: The mobile application (App) is downloaded and installed on the mobile device from the appropriate software store—Google Play or iTunes can be used for either Android operating systems or Apple iOS respectively.

Step 3: The App is launched on the mobile device. When the App is launched, the commissioning tool communicates with the mobile device via serial data port and the commissioning tool specifies a reply to the mobile device indicating it is functional and ready to transmit.

Figure 3:
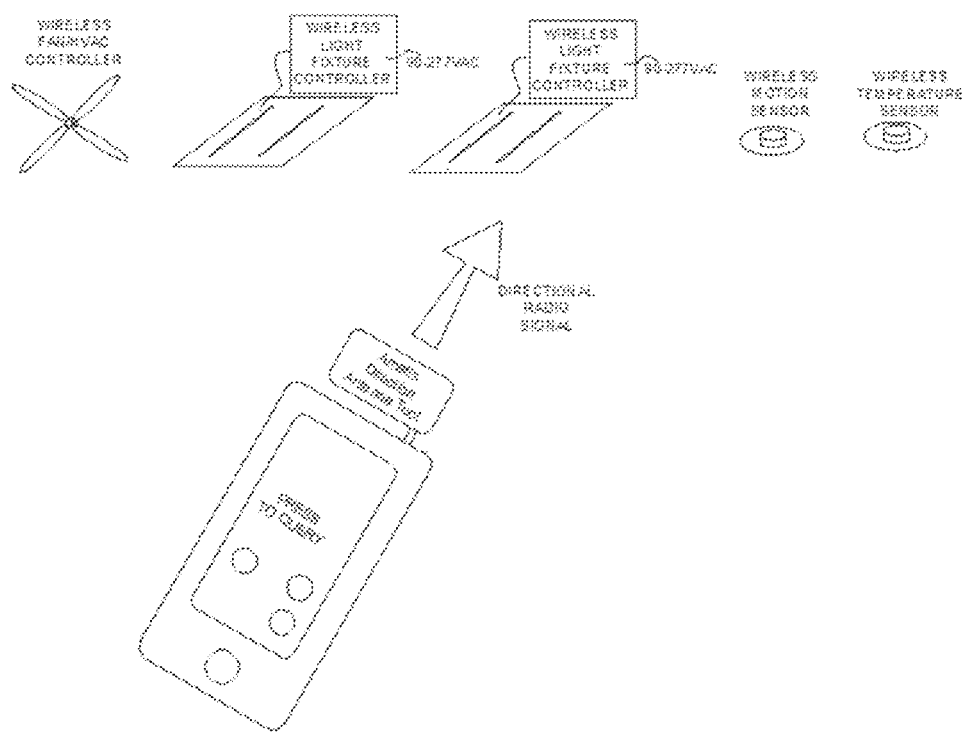
FIG. 3 illustrates the directional functionality of the commissioning tool and its ability to work with a number of different 6LoWPAN devices such as HVAC controllers, lighting controllers, and sensors.

Step 4: The commissioning tool is pointed at a powered and installed wireless device that is being targeted for programming (See FIG. 3). In some embodiments, the commissioning tool can be directional so as to facilitate identification of a wireless device. In one such embodiment, the commissioning tool can communicate with wireless devices at which it is pointed (See FIG. 1).

Figure 4:
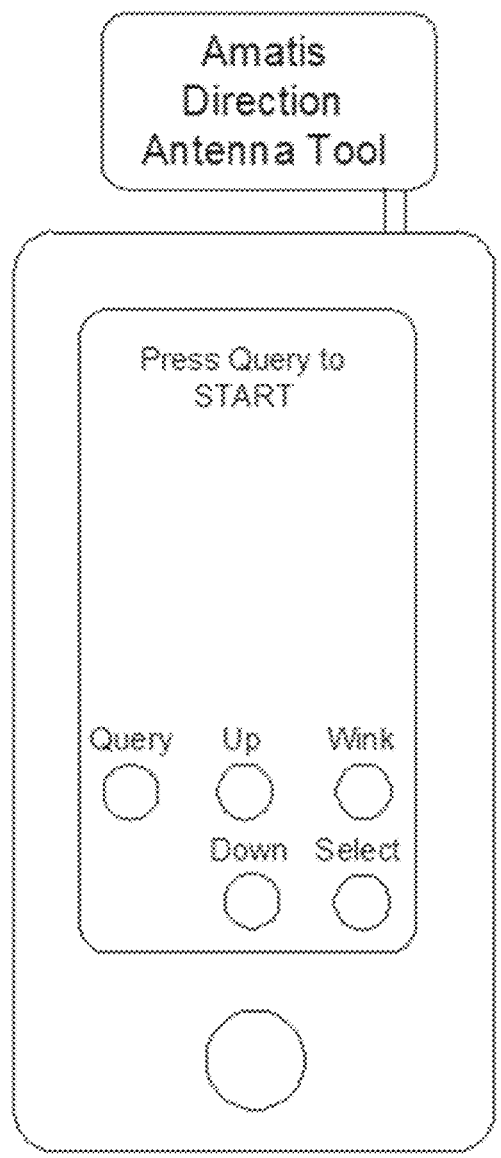
FIG. 4 illustrates the commissioning tool's display screen during query communication with 6LoWPAN devices.

Step 5: While pointing in the direction of the targeted device the user initiates a "query" command by pressing the corresponding button on the display screen (See FIG. 4). After the user selects query, the mobile device sends a serial communication to the commissioning tool initiating the query sequence. (In other embodiments, the microprocessor in the stand-alone commissioning device commands the antenna to initiate the query sequence.)

Step 6: During the query sequence the microprocessor on the commissioning tool sets the radio frequency transmission generated by the antenna to the minimum power level. This low power level is designed to locate the device nearest to the commissioning tool without locating devices further away.

Step 7: The commissioning tool microprocessor sends a query transmission via the radio antenna at 2.4 GHz requesting a response from the targeted device.

Step 8: The commissioning tool pauses for a reply. If the device replies to the commissioning tool as expected move to Step 9. If there is no response from the targeted device proceed to Step 8A.

Step 8A: If no reply is received from the targeted device, the commissioning tool microprocessor sets the radio frequency antenna to a higher power transmission and returns to Step 7 with a higher power transmission.

Step 9: The commissioning tool receives a single message, or multiple messages in response to the query command. If exactly one message from a single device is received, the microprocessor reads the IP6 address of the responding device and displays the name, type and IP6 address (or shortened MAC address) for the responding device. If multiple messages are received, all names, types, and addresses are displayed and the process proceeds to Step 11.

Step 10: When a single device name and address are displayed, the microprocessor will prompt the user to "wink" the device by pressing the wink labeled button on the display.

Step 10A: A wink command is sent by the microprocessor to the radio antenna, which transmits a radio signal specific to the IP6 address of the targeted device (6LoWPAN radio frequency) at normal power. In certain embodiments, a successful transmitting and receiving of a wink command will prompt the device to toggle "ON" or "OFF," or dim for example a lighting device, or adjust fan/pump speed for example a HVAC device. If the correctly targeted device responds by winking, then process proceeds to Step 13. If the targeted device does not wink in response, then the microprocessor will return the process to Step 10.

Figure 5:
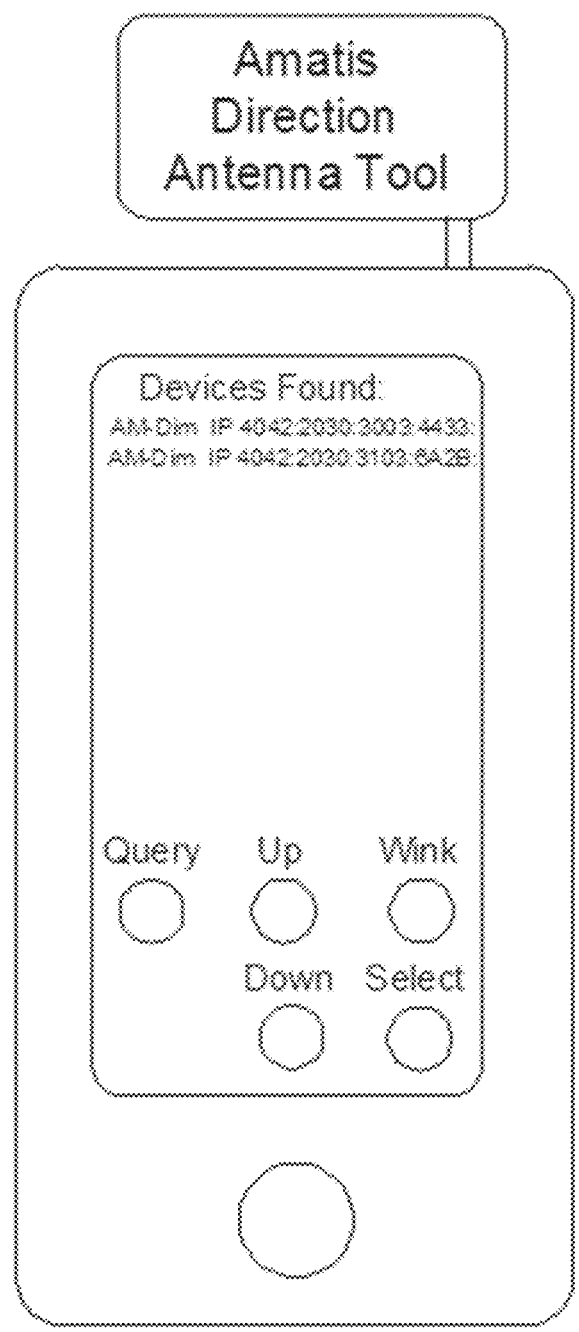
FIG. 5 illustrates the commissioning tool's display screen after devices are queried and located.

Step 11: If multiple messages are received in response to the query message by the commissioning tool, then multiple device names and address are shown on the display and a scroll prompts the user to select a single device (See FIG. 5).

Step 12: When the user chooses a single device on the displayed list by using the scroll, then choice prompts the commissioning tool microprocessor to send a wink command to the chosen device via the radio antenna.

Step 12A: A wink command is sent by the microprocessor to the radio antenna, which transmits a radio signal specific to the IP6 address of the chosen device (6LoWPAN radio frequency) at normal power. In certain embodiments, a successful transmitting and receiving of a wink command will prompt the chosen device to toggle "ON" or "OFF," or dim for example a lighting device, or adjust fan/pump speed for example a HVAC device. If the chosen device responds by winking, then process proceeds to Step 13. If the targeted device does not wink in response, then the microprocessor will return the process to Step 11.

Step 13: The correctly targeted/chosen device is identified successfully. In certain embodiments, the microprocessor stores the location and name of the device, related to its specific IP6 address (or shortened MAC address), in the commissioning tool computer memory, or in memory on the mobile device, or in both the commissioning tool memory and memory on the mobile device. By storing the identity and location of the device the commissioning tool will be able to program the device wirelessly with precise 6LoWPAN radio signals.

Figure 6:
FIG. 6 illustrates the commissioning tool's display screen during selection of labels for a set of devices or a zone where all devices are located and programmed to operate together.

Step 14: After successful identification of the targeted/chosen device the commissioning tool communicates via the App and mobile phone Internet connection, or via other software and communication network, to a data-base such as, for example a web-based database where information about the building site and specific locations are stored. The microprocessor can read the available information remotely and display choices for the user to label the identified device (See FIG. 6). The user can be prompted to apply a label to the identified device by selecting an option from the scroll.

Step 15: The user can determine if an accurate location is displayed or the user will choose to create a new label by selecting "Create New Location" (See FIG. 6). If an accurate location is displayed the process proceeds to Step 17. If the user chooses to create a new location name the process proceeds to Step 16.

Step 16: If the user presses the "Create New Location" button, the microprocessor will command the commissioning tool to display a keyboard on the App. The user will be prompted to create a new location name by entering it on the keyboard.

Step 17: After a location is chosen or created by the user, the microprocessor will communicate with the web-based database and the local memory on the commissioning tool to store the location related to the identified device. The user will then be prompted to create a unique label for the identified and located device. The App displays a keyboard on the display and the user enters a name for the device, for example, "Lights over Boardroom Table."

Step 18: The commissioning tool sends a notice to the web-based database to store the programming for the identified device with its location and label. The microprocessor, via the mobile App, communicates through a mobile Internet connection to send a location string and the unique IP6 address (or shortened MAC address) so the device is identifiable by the newly assigned name, location, and label.

Figure 7:
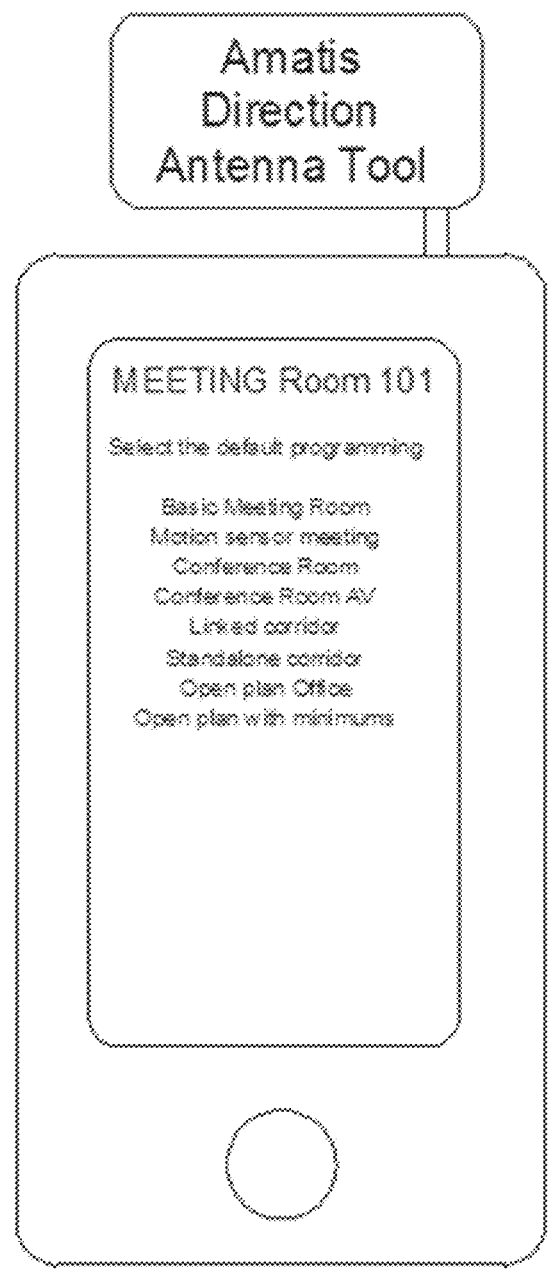
FIG. 7 illustrates the commissioning tool's display screen for choosing default programming for a set of devices operating together in a zone.

Step 19: After a unique label is applied to the device, the microprocessor searches a web-based database for default programming and prompt the user to select from available default programs. The commissioning tool displays a scroll of default programming choices for the user (See FIG. 7). If no default programming is available or if the user does not choose a default program, the process returns to Step 3 in order to locate and commission the next device. In order to program default settings proceed to Step 20.

Step 20: The commissioning tool displays a list of available default programs for the user to choose, for example, "Basic Meeting Room," by selecting an option from the scroll list. Choosing a default sends programming parameters to the device, in certain embodiments, for example, "Basic Meeting Room" default programming includes specific dim levels and lighting scenes for lighting devices.

Step 21: After a default is chosen the commissioning tool will display a prompt notifying the user that default programming will overwrite any existing programming. If there is no default chosen then the process returns to Step 3 in order to locate and commission the next device. If a default is chosen this process proceeds to Step 22.

Step 22: The commissioning tool microprocessor directs the antenna to transmit programming commands to the located device including default settings, for example, "Basic Meeting Room" default programming that includes specific dim levels and lighting scenes for lighting devices. After programming and commissioning of a single device is complete the process reverts to Step 3.

Data Reporting from Devices to the Internet via 6LoWPAN Radio Frequency

Electronic hardware and custom software enable remote acquisition of specific performance data for HVAC, hot water, and lighting systems. The primary hardware devices facilitating this data transmission and reporting are a 6LoWPAN radio transceiver/receiver module and a border router. When installed, this hardware makes ordinary mechanical and electronic systems "smart" by enabling wireless transmission of performance data over 6LoWPAN radio frequency, and enabling real-time reporting of performance data by uploading the Internet via the border router. In some embodiments a web-based energy dashboard displays this performance data in real time on any Smartphone, tablet or computer with Internet access. The energy dashboard, in some embodiments, benefits users by collecting and displaying real-time performance data. Conventional HVAC, hot water, and lighting systems do not transmit performance data to the Internet. Systems that do offer Internet-connectivity depend on direct connection via Ethernet cords or installed WiFi routers as an interface for Internet connections. This combination of 6LoWPAN hardware and software make detailed analytics and controls available to the user from any Internet connected Smartphone, tablet, or computer with information transmitted wirelessly and uploaded directly to the Internet.

6LoWPAN is an open wireless communications protocol that does not demand any licensing fees. Working with an open communications protocol, this method is able to interface with any number of third-party devices that utilize 6LoWPAN for wireless communication. The border router sends efficient packets of data to the Internet via direct Ethernet connection or wireless cellular Internet connection after receiving 6LoWPAN data transmissions. Such a system precludes the need for wired Internet-connections on meters, monitors, and controllers or any set-up for WiFi enabled meters, monitors, and controllers which can be onerous and time consuming for installers.

Geographic Mapping of 6LoWPAN Networks Using Mesh Network Structures and Radio Frequency Strengths 6LoWPAN enabled devices are perfectly suited to build mesh networks. The reason that these devices are suited to mesh networking, or multi-hop networks, is that the radio frequency transmitted/receiver module is aware of other 6LoWPAN devices located nearby. The modules, embedded into meters, monitors, and controllers, are programmed to automatically find other 6LoWPAN devices within a given geographical space. When recognized, the modules automatically build a mesh network via two-way radio frequency communication. Because these modules are aware of other 6LoWPAN devices in a geographic area smart-building wireless networks can be established very quickly. This means there is no user input required beyond physically installing the device. Mesh networks enable two-way communication between nodes, allowing data to hop between devices, without a master-slave paradigm. Mesh networking allows devices to find the most efficient pathway for data to be transmitted to the border router and uploaded to the Internet.

Using radio frequency signal strengths recognized it is possible to generate a map of where each device is located in a geographical space. Through triangulation, a node in a mesh network can pinpoint its location relative to multiple other nodes. This triangulation generates a perspective of devices by the strength of radio frequency attenuation. In doing so, the nodes generate a basic map of their physical location in a space. Radio frequencies are attenuated by obstructions such as walls within a building, so reading frequency attenuations and triangulating the position of other nodes generates a virtual map of the network. Maps are very useful to installers attempting to locate specific devices within a larger network. The virtual network map can be overlaid onto a schematic for a full visualization of the installation.

PNG Schematics for Mobile Devices and Web-based User Interfaces

Current HVAC, hot water, and lighting systems are very complex. Without detailed geographical visualizations these systems are difficult to monitor and control. In order to assist building owners, tenets, and other users with managing these systems, a computer-aided design (CAD) visualization of building systems is useful. During typical building construction processes, architects and engineers create floor plans and schematics of the building, mechanical, and electronic systems for general contractors and installers. Conventional AutoCAD drawings are created with file types such as DWG (DraWinG) or BMP (Bitmap), which are both very large files. The size and complexity of these files prevents a final animated schematic from being displayed fluidly on web-based software and mobile devices.

Developing easy to use schematics will quicken and simplify the process of commissioning wireless networked electronic devices. This method makes use of floor plans produced in CAD software that have integrated "layers." Using custom software, this method exports CAD layers as individual transparent PNG (Portable Network Graphic) files, ensuring all PNG files reference the same location as the CAD file. Because PNG files are much smaller in data size, the schematics are available for faster and simpler viewing on mobile devices and web-based software.

The PNG files are uploaded to web-based software as a ZIP file. To complete this method the following steps are taken:

1) The first CAD layer is exported as a PNG and designated as the "Base Layer," displayed all the time in the web-based dashboard; 2) A folder is created for each active point on the schematic; these folders are called "Animations." In certain embodiments, an animation can be a section of the drawing that changes color to represents an action of HVAC, hot water, or lighting systems. The desired PNG files are copied to the Animation folder and "tagged" to an actual device reporting real-time performance data, such as a thermostat. A logic control is available that defines what state is "True," such as >1 but <2. For example in FIGS. 10A-10C, when "Cooling" is active in this geographic location the active section is colored blue. 3) The animation folder is given an animation speed used to create moving images. Multiple PNG files can be added to a drawing. If the tag for the folder is "true," each PNG file is displayed in order, the previously displayed image is turned off as the next appears until the last image is displayed. The cycle is then repeated as long as the folder tag remains "true." This animation method displays moving images that represent the state of mechanical and electronic systems. For example a fan can be shown rotating when it is on and this method can connect the rotating speed of the animation to the real time speed of the fan.

The schematic will be viewable on mobile devices and tablets that have limited processing power and limited Internet data rates. The method described above minimizes the size of the files that need to be downloaded and displayed on a mobile device. This method allows complex animations to be displayed using limited bandwidth on mobile device with fully functioning animation.

FIG. 10A shows the area defined as background. FIG. 10B would be copied into an animation folder that could be named "Zone Cooling." This animation folder, for example, would be linked to data transmitted by the living room thermostat. The resulting animation would be:

If cooling thermostat is "OFF" the screen would display FIG. 10A; and if the cooling thermostat is "ON" the screen would display FIG. 10C.

As seen in FIGS. 10A-10C, the CAD layers can be turned on or off in order to display all or part of the drawing. FIG. 10C shows the Background layer and Zone Cooling layer. In this way, animations can be created where the state of individual zones can be quickly viewed and understood. In certain embodiments, when the user sees a floor area is colored blue, then the user will understand that zone is actively cooling, if the floor is displayed red active heating can be identified. Certain embodiments of this method also include visualizations for lighting use, energy generation, and energy consumption in mechanical systems, etc.

IP6 Address Conversion to Unique Alphanumeric Media Access Control (MAC) Identifier 6LoWPAN devices communicate by transmitting data via radio frequency to a border router, which then uploads data to a web-based dashboard. Traditional methods of connecting similar wireless devices together require customers to use exact IP addresses. IP6 addresses are comprised of a 128-bit binary code that require accurate entry to be successful and can present difficulties for installers.

The novel approach to solve for this complex process uses simple and unique identifiers printed on devices and displayed with quick response (QR) codes. The unique identifier is a function of a media access control (MAC) address. MAC addresses used are between 6 and 9 digits in hexadecimal format. In order to connect to a device through the web-portal, customers must enter a shorter hexadecimal code, rather than a long string of numbers, giving customers a much greater rate of success connecting the first time.

6LoWPAN Multicast Supervisor

Standard multicast is a method of delivering messages to a range of nodes in a network with a single transmission. With conventional building controls, devices must communicate a broadcast message to all other devices. 6LoWPAN is generally limited to peer-to-peer communications, because it has been designed for single computer to access a single website, or in this scenario, a single 6LoWPAN node is designed to talk with only one other single node. This limitation prevents some essential functions required for building controls. Standard multicast is recognized within the open 6LoWPAN protocol, however ordinary 6LoWPAN communications demand a "phone-tree" method of individually a contacting each node.

A multicast supervisor is a novel approach designed to overcome specific peer-to-peer limitations of 6LoWPAN communication. This method enables a single broadcasted message to reach all devices simultaneously while checking for nodes that were missed or overlooked and resending messages to any nodes that missed the primary transmission. The original broadcasted message is time dependent. The supervisor message is not time dependent and is programmed to take place only when the network communication traffic is low. Due to interference or other reasons, one node may not receive the original broadcasted command. To handle missed messages, the multicast supervisor is programmed with "event/scene" tables and the expected outcomes the original broadcasted message should trigger when received by all nodes. After the original message is sent the multicast supervisor function, during quiet moments on the network, uses peer-to-peer messaging to confirm each device has received and correctly acted on the original broadcasted message. This function may take a few seconds to a few minutes because it only happens during quiet network time. The unique multicast supervisor feature achieves time critical messaging but retains high accuracy and confirms message acknowledgment.

Figure 12:
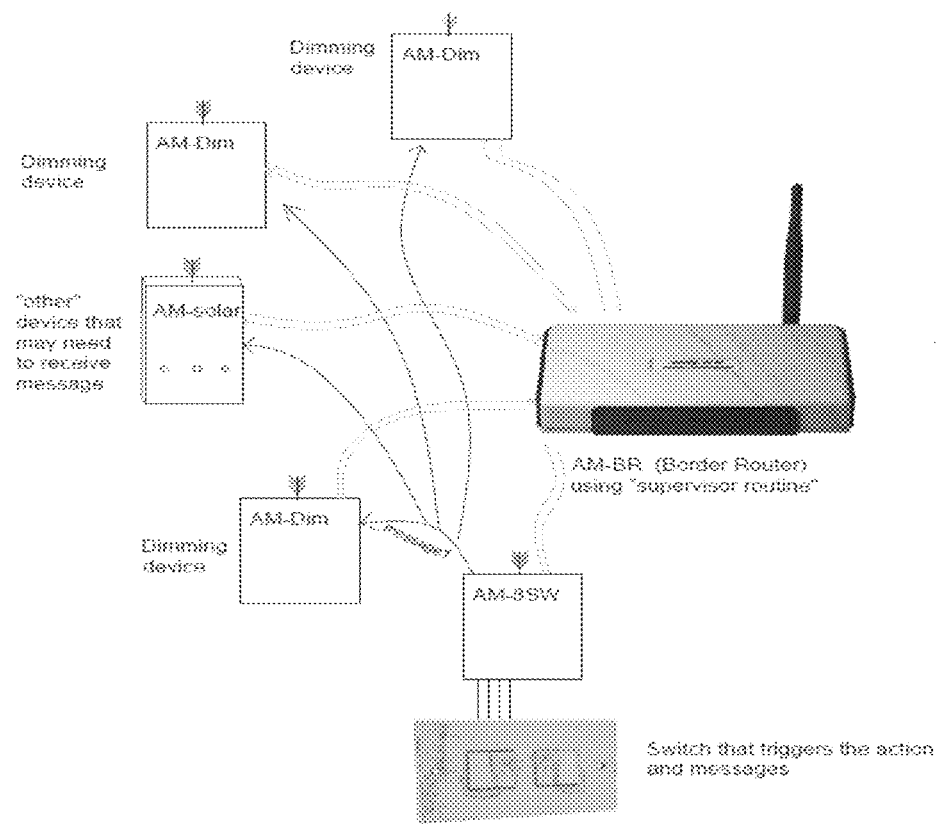
FIG. 12 illustrates a Multicast Supervisor communication protocol with a multi-node network of devices. The switch/controller is shown broadcasting a single message to all devices (blue lines) received at the same time. The supervisor message (cyan lines), transmitted by the border router in this example, confirms whether each device has received the original command. The supervisor message is sent when network activity is low and the message is not time sensitive.

To work within the constraints of narrow bandwidth, nodes do not acknowledge the multicast message. During a multicast, 99.9% of nodes receive the message as illustrated with the blue lines in FIG. 12. The supervisor node, as represented by the border router in this example, is responsible for confirming receipt of the original message during quite times in network communication. In other embodiments, the "switch/actuator of the message" can also act as the supervisor node.

Distributed Wireless Communication for Mechanical and Electronic Controls

Figure 13:
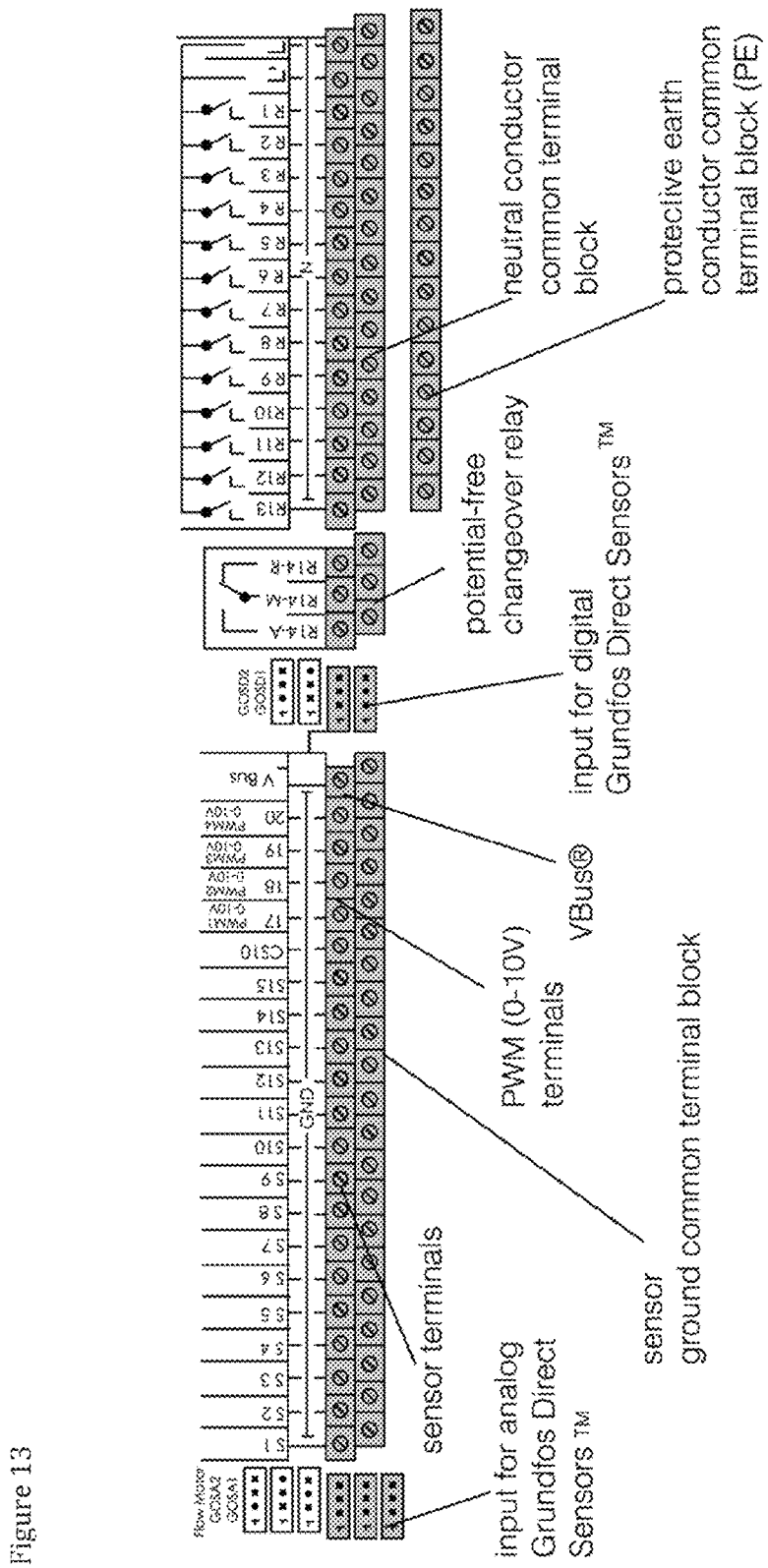
FIG. 13 illustrates a conventional wiring schematic for a standard solar controller, which is extremely complex. Because of the high number of inputs and the complex wiring required, this illustration shows how easily errors can be made during installation.

Conventional HVAC, hot water, and lighting system controllers are very complicated because they require many connections into a single, multipurpose device. These conventional controllers can require multiple programming menus and many physical terminations. An example of this complexity is shown in FIG. 13.

Figure 14:
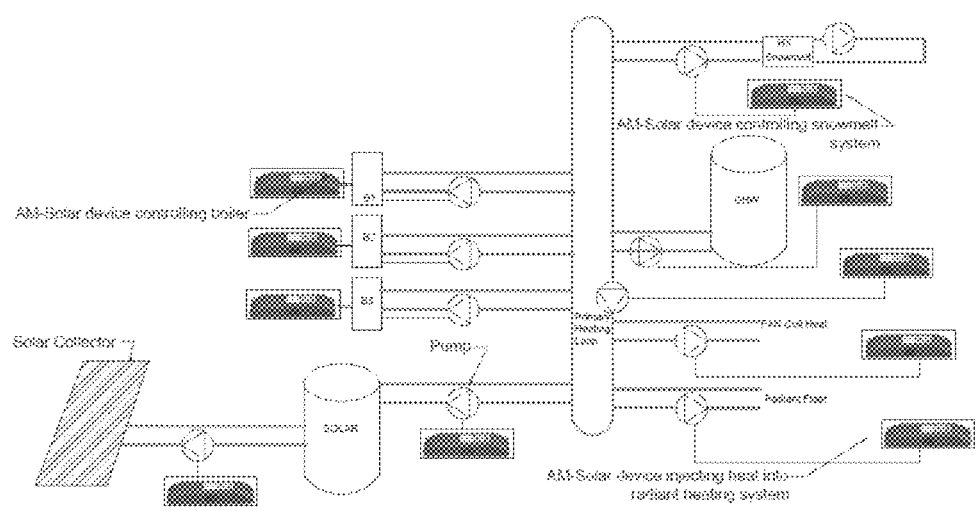
FIG. 14 illustrates a distributed set of sensors and controllers in a hot water system. The distributed nature of these wireless 6LoWPAN devices is meant to simplify installation without sacrificing highly functioning monitors and controls, which provide real-time performance data throughout the entire system.
Figure 15:
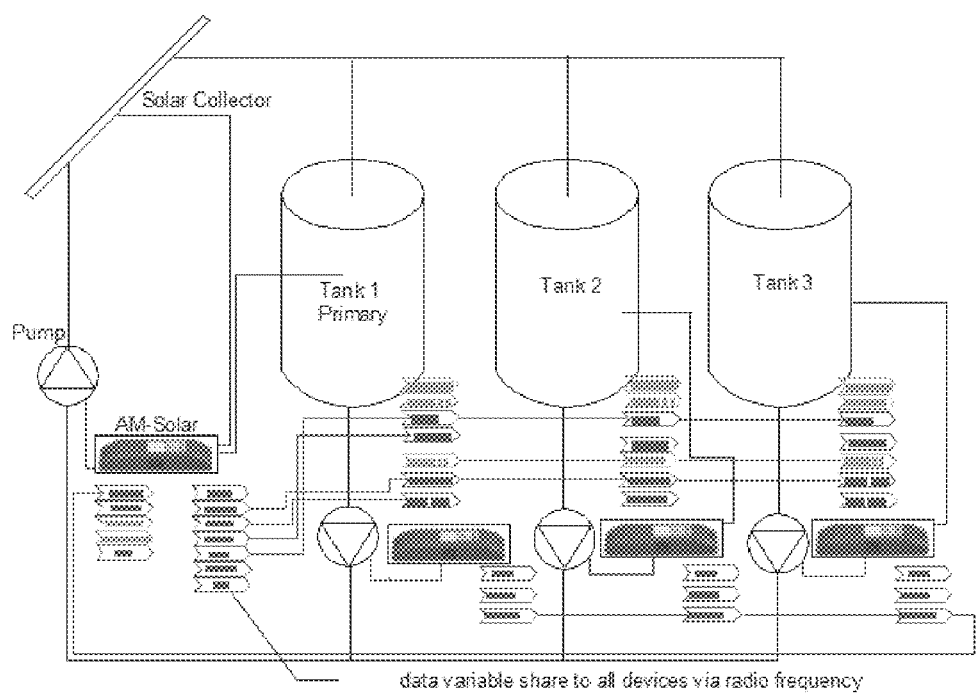
FIG. 15 illustrates another example of distributed controls for a hot water system. The green and yellow icons signify data that is shared amongst devices via 6LoWPAN wireless radio frequency.

Distributed wireless communication over 6LoWPAN protocols allows for many distinct controllers instead of relying on only one controller (See FIG. 14 and FIG. 15). The benefit of this approach is that designs for each device remain fairly straightforward. For example, in certain embodiments, a device controlling radiant heating injection requires programming a single set point. During conventional installations an installer would have to navigate numerous programming menus to find a particular value. In conventional systems like this, the installer is required to hardwire sensors, meters, and pumps back to the controller. Additional wiring increases the cost of the system and the time necessary to complete the installation. Wiring also creates many opportunities for installation mistakes. Often the installation does not get programmed properly contributing to system inefficiencies. With a distributed wireless solution all pumps in different locations can be connected wirelessly and can communicate with each other and the entire network without complicated wiring. Essentially the distributed wireless communication for mechanical and electronic controls is a "plug-and-play" system.

The advantages of a distributed control and wireless communication systems are a much simpler set-up and straightforward installation thereby increasing the installation success rate and lowering the costs of installation. The installation process for wireless distributed controls is more forgiving, it requires less skill and time, and is therefore cheaper, faster, and more accurate.

Measuring Thermal Energy Stored in Solid or Liquid Mass

To read the energy stored in any thermal mass such as a concrete slab or a water tank, measurement of the temperature gradient throughout the material is required. To read a temperature gradient, sensor readings must be taken at various depths of the thermal mass. Accurate temperature readings at different depths of a thermal mass are only possible when there is very little temperature mixing (conduction) between different depths. To keep temperature mixing at a minimum, Amatis relies on a Flexible Printed Circuit Board (Flexi-PCB) rather than conventional rigid fiberglass rigid printed circuit board. The Flexi-PCB does not conduct heat as efficiently as fiberglass resulting in less thermal conduction through the sensor, minimizing temperature mixing in the layers of thermal mass being monitored.

The Flexi-PCB is a novel way to measure temperature gradients in various types of thermal mass. Conventional enthalpy sensors measure the electrical resistance (ohms) of a cable. Measuring the electrical resistance of a sensor cable in a water tank or concrete slab with a determined volume yields an accurate average of thermal energy in the mass. Since conventional enthalpy sensors read average enthalpy, this method is unable to differentiate between temperature gradients within the thermal mass. It is beneficial to know where temperature gradients exist because it will allow the sensor to identify a particular source of thermal input. In certain embodiments, the Flexi-PCB can determine whether heat energy is provided by a solar thermal array or an auxiliary heat source such as natural gas, electricity, heating oil, or propane. Each heat source will have a different temperature signature within the gradient. Inaccurate measurements of energy generation are likely without determining temperature gradients in a given thermal mass.

Figure 16:
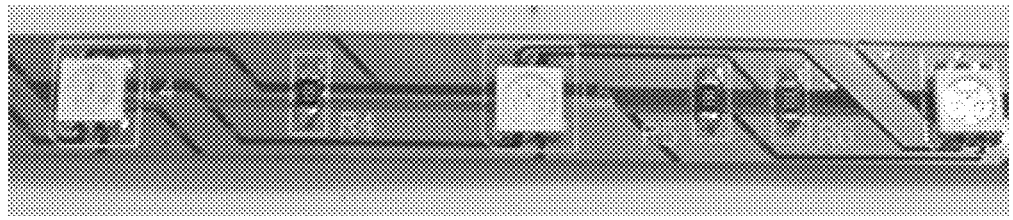
FIG. 16 shows a photograph of the Flexi-PCB sensor that can be cut to size by installers and inserted into any solid or liquid thermal mass.
Figure 17A:
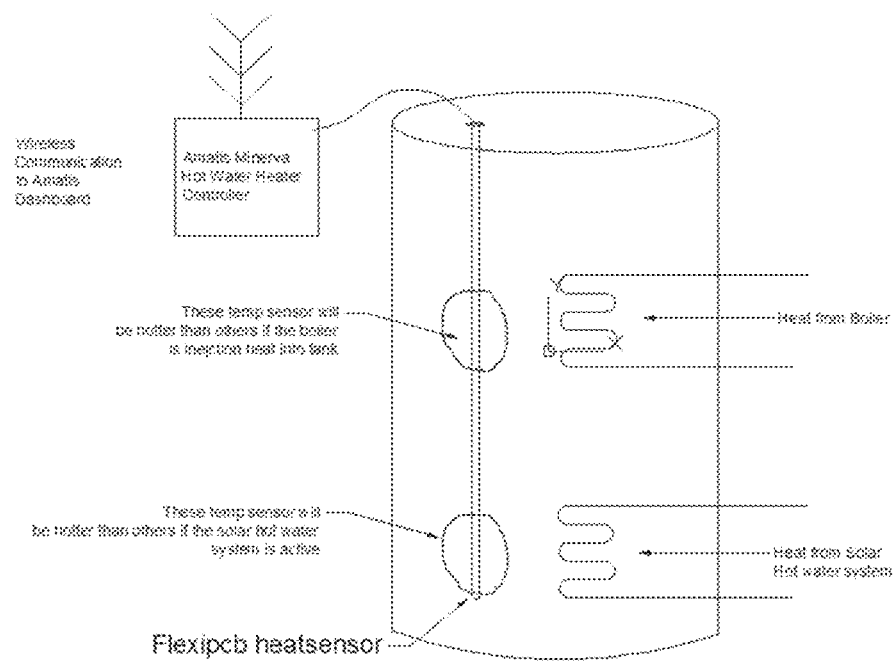
FIG. 17A illustrates a diagram of the hot water tank controller connected to the Flexi-PCB sensors installed inside a hot water tank. This diagram shows why temperature gradient sensing is important for accurate data on thermal energy generation. Sensors nearer to the solar hot water (SHW) heat exchanger will track thermal energy generated from the SHW system. Sensors nearer to than the boiler heat exchanger will differentiate any thermal changes that can be attributed to auxiliary fuel sources. The hot water tank controller wirelessly transmits performance data to the border router so it may be uploaded to the web-based dashboard.
Figure 17B:
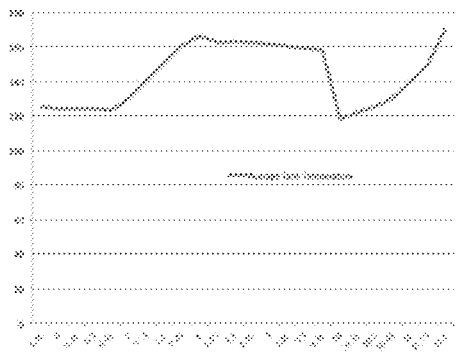
FIG. 17B illustrates average hot water tank temperature (y-axis) plotted against the time of day (x-axis). The average tank temperature is found by reading temperatures placed along a sensor and calculating an average. This graph shows that at 6:45 AM the tank is heated for regular morning hot water use and that a hot shower is taken at 9:45 AM, which is later than normal. So, as the hot water tank loses thermal energy over time, thermal energy was lost because the tank is heated long before the energy was demanded. The self-learning algorithms can predict and adjust hot water usage so less energy is wasted.
Figure 17C:
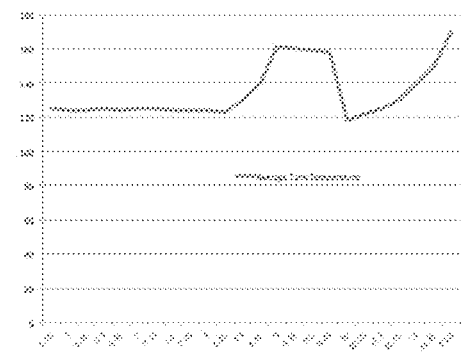
FIG. 17C illustrates how the self-learning algorithms adjust the system a few days later, if hot shower water usage continues to occur around 9:45 AM. This graph shows that the system pre-heated the hot water tank at 8:30 AM for use at 9:45 AM. This results in less in-tank energy losses than previously shown in FIG. 16B. By closely monitoring average tank temperature and predicting hot water demand, the overall average tank temperature can be lowered in order to save costs.

The Flexi-PCB has multiple digital temperature sensors along the assembly (See FIG. 16). The assembly is inserted entirely into the concrete slab or water tank. Each of the temperature sensors on the flexible strip is digitally addressed and each sensor on the strip is uniquely identified with a digital address. The strip has a simple four wire connections at each end. Total thermal energy is calculated by reading the change in temperature calculated with the volume of the mass being measured.

At various points along the sensor there are cut-marks so installers may tailor the assembly to the appropriate length. This means a single sized sensor can be manufactured and supplied allowing installers to simply cut the sensor to any desired length. The sensor is connected to a 6LoWPAN controller that can be commissioned and integrated into the entire network of wireless electronic devices transmitting data wirelessly to the border router.

Hot Water Controller for Generation and Distribution

Hot water generation can account for anywhere from 15% to 60% of utility costs depending on the specific uses and fuel sources. Controlling, programming, and predicting hot water generation and distribution throughout a building can achieve significant energy savings and cost reduction. Hot water tank temperature can be set manually by users anywhere between 90° F. and 180° F. With intelligent controls there are times when hot water tanks can be programmed to maintain lower temperatures when there is lesser demand for hot water.

A hot water tank controller that offers Smartphone accessible control, metering, and programming, as well self-learning algorithms that track hot water use patterns and predict when usage will increase can provide significant benefits to residential and commercial users. The hot water controller offers accurate temperature control of tanks to ensure comfort and convenience with the maximum energy efficiency. 6LoWPAN hardware connected to a Flexi-PCB sensor transmits hot water tank performance to the Internet. A web-based dashboard offers users the ability to pre-heat tanks ahead of predictable hot water demand. Over time, self-learning algorithms predict and adjust pre-heating based on the users' activity and behavior automatically.

The hot water controller also tracks energy costs required to heat water, monitors in-tank heat losses, and calculates performance data. In some embodiments, performance data can include energy and water usage for a single shower, a single dishwater use, a single load of laundry, etc. Tracking this performance data allows users to make better decisions that maximize energy conservation and cost savings.

In some embodiments, the controller includes external water sensors that will alert users in case of any leaks or flooding from the hot water tank, minimizing the risk of major water damage going unnoticed. In the case of a broken pipes or tank leaks, flood sensing capability can reduce insurance rates on building owners.

The hot water controller integrates smart features of a programmable device into gas, electric, or solar hot water tanks. In addition to the functions provided with self-learning algorithms, the programmable controller can set tank temperatures remotely. At times where users are away on vacation, or during seasonal fluctuations of hot water demand, or any other factors affecting the desired in-tank water temperature, remote control via Smartphone, table, or computer enables responsible energy use and cost savings. Monitoring the average tank temperature and predicting when hot water use occurs means the annual average tank temperature can be significantly lowered. This results in considerable savings as the tank energy losses depend on the tank temperature.

Solar Hot Water Harvesting Optimization

Conventional Solar Hot Water (SHW) controllers must manage a solar pump, hot water injection to multiple storage tanks, and pumping for multiple heating loops. Some controllers must also differentiate between homes and commercial applications as well as alternative uses such as swimming pools and spas. Each function requires programming a set point, a pump controller, and multiple temperature sensors.

A novel approach to optimize SHW systems is described below. By harvesting the thermal energy created by solar collectors and storing heat energy in thermal mass areas such as concrete slabs and hot water tanks, as the primary solar storage tank hits its maximum temperature set point, any extra thermal energy that can be harvested and stored in auxiliary thermal masses. Because solar storage tanks, hot water tanks, and concrete slabs will reach their storage capacity at different times, thermal energy can be directed to the different storage areas at different times and energy collection via solar thermal arrays can be maximized.

First, it is crucial to know which areas have been supplied with energy so energy can be more usefully directed to other areas. The Flexi-PCB and hot water controller provide data to the SHW controller, so that this SHW controller can direct available thermal energy to the optimal storage area.

In conventional SHW systems, when the solar storage tank's maximum set point is reached the system will either drain back to prevent overheating or continue heating above the set point, in a closed-loop system, reducing efficiency and wasting collected thermal energy in order to protect the system.

In order to direct the solar thermal array to continue delivering heat energy, the thermostat connected to the primary solar storage tank must be overridden and the boiler must be locked out. Flexi-PCB sensors in other available thermal masses will notify the SHW controller of available thermal storage. The thermostat override will allow the solar array to continue collecting heat energy, distributing the thermal collection to other thermal masses. 6LoWPAN pump controls and valves will communicate wirelessly with the SHW controller and open radiant loops that feed thermal energy to either a concrete slab or an alternate hot water tank. Each area will have individual temperature set points.

For example, in some embodiments, when the primary solar storage tank set point is 130° F. and that set point is reached, a diversion in the primary loop will be opened and the thermostat in the solar storage tank will be overridden. The diversion will direct thermal energy to thermal areas that can store energy. 6LoWPAN sensors and valve controls work together to direct extra thermal energy to the optimal storage area. This method allows solar arrays to continue collecting heat and storing it in alternative thermal masses so it is not wasted. The entire system requires that alternative thermal masses are available. With a network of 6LoWPAN sensors, pump controls, and valve controls programmed to communicate with each other, the maximum efficiency of available thermal energy can be utilized instead of wasted when temperature maximums are reached.

Polarity Correction for Direct Current (DC) Controls

Light-Emitting Diodes (LEDs) and other DC electronic fixtures require the correct polarity of power supplies to function properly. In conventional DC lighting applications this is hard to guarantee and many mistakes can occur during installation. In a conventional system it is possible to integrate polarity correction devices with individual outputs, such as an LED driver or fluorescent ballast. However, the novel approach described below is more effective than adding polarity correction modules to each device. In certain embodiments of this method, polarity correction mechanisms are built into the controllers. Because this controller can be wired to multiple lighting nodes it dispatches the correction to multiple devices. The circuit design used to accomplish this fits within the DC controller. Wired connections can be installed without concern for the correct polarity because the output voltages will be corrected by the polarity correcting circuitry in the DC controller.

Figure 18:
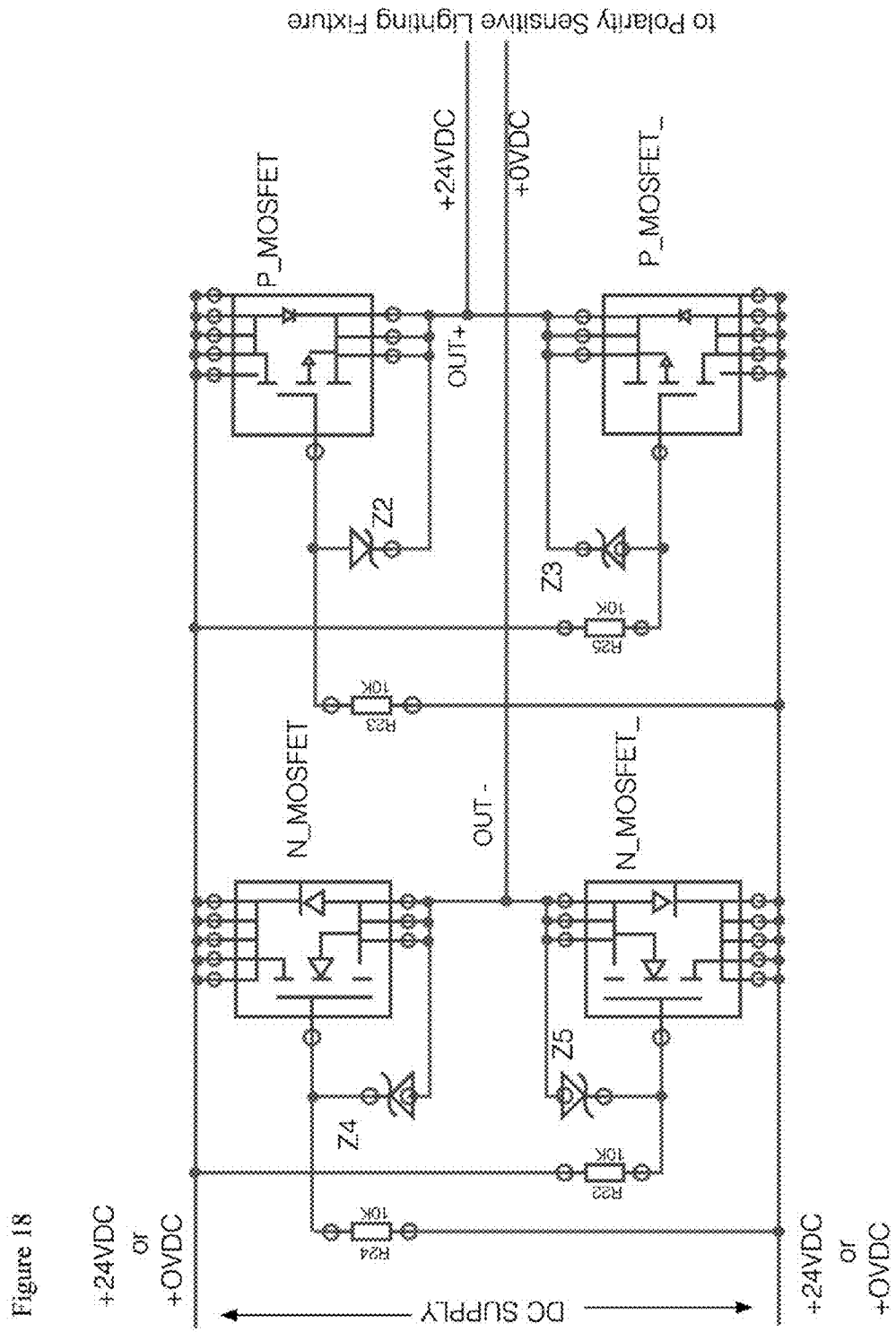
FIG. 18 is a diagram of the DC polarity correction Field-Effect Transistor (FET) circuit with two N-channel Mosfets and two P-channel Mosfets. This circuit acts like a bridge ensuring the polarity of the power output is always the same regardless of where the inputs are wired.

This method differs from other conventional solutions on the market because it uses an active Field-Effect Transistor (FET) circuit with two N-channel Mosfets and two P-channel Mosfets (See FIG. 18). This method has very low electrical resistance and very high power efficiency. Conventional polarity correction devices use passive diode bridges, which commonly involve higher heat dissipation rates and lower efficiency rates. The FET solution increases the efficiency of the polarity correction circuit for lighting fixtures and DC devices and integrates the circuits directly into the 6LoWPAN drivers.

Figure 19:
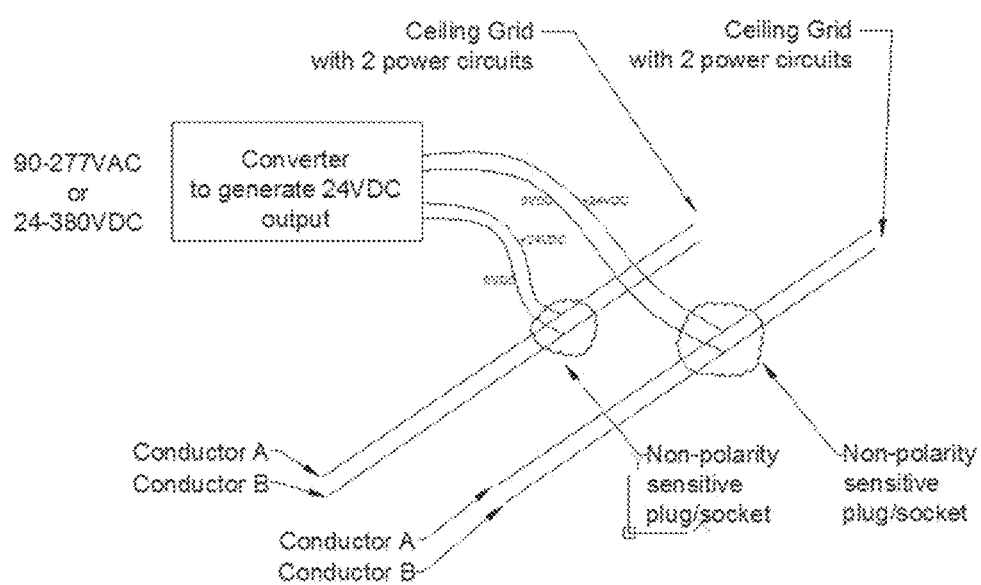
FIG. 19 illustrates a DC ceiling grid with non-polarity sensitive sockets. This figure demonstrates how conventional DC powered systems on a grid can be +24VDC while being 0VDC on another grid. LED lighting fixtures require power to applied such that +24VDC is power from the +24VDC signal and 0V. At the point where the lighting fixture attaches to the grid polarity is unknown, so the connections are made at either +24VDC or 0V.
Figure 20:
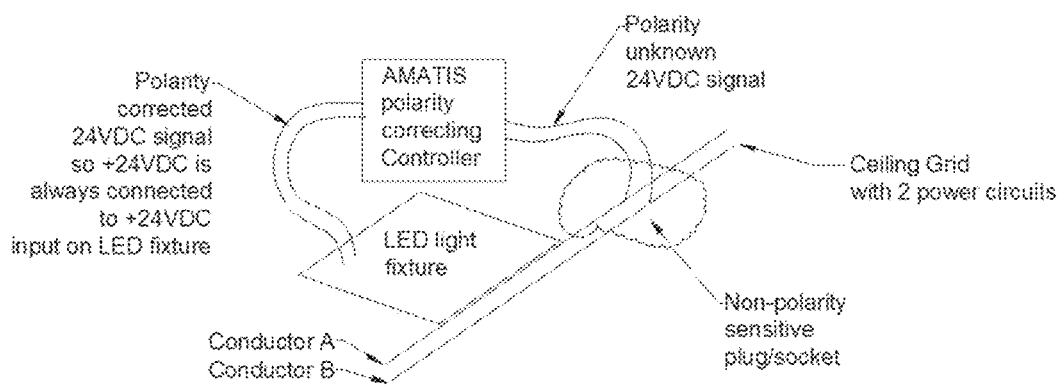
FIG. 20 illustrates the DC polarity correction device wired between the ceiling grid and the LED fixture. LED lighting installations should be designed as efficient as possible. Using Mosfets with very low electrical resistance (0.03 ohms) this device is physically small enough to fit into the lighting fixture or into the cable connector. In addition the polarity conversion can be made without generating a significant amount of heat. Conventional diodes and other techniques generated more heat and electric resistance. This novel polarity correction method maintains overall efficiency while providing simple installation solutions where installers do not need to be concerned about the polarity of the connections to the LED drivers.

In some embodiment of this method, suspended ceiling fixtures conduct power to lighting fixtures using the ceiling grid itself. Each grid section has two power conductors rated at 24 volts direct current (VDC). Power is applied to the each grid section from power converters. The power converters output a +24VDC signal and a 0VDC signal. These are connected to the ceiling grid using cables and connectors. The connectors are not polarity correcting and can be plugged in either way (See FIG. 19 and FIG. 20).

What is claimed is:

1. A method of commissioning networks of wireless device, the method comprising:
    generating a device query, wherein the device query comprises a request for device information;
    broadcasting the device query at a first power level, wherein the first power level is a minimum power level;
    receiving a first query response comprising first device information for a first wireless device within a network of wireless devices, wherein the first device information identifies an aspect of the first wireless device;
    receiving a second query response comprising second device information for a second wireless device within the network, wherein the second device information identifies an aspect of the second wireless device;
    generating a first wink message, wherein the first wink message comprises instructions for a receiving device to provide a visible indicator of receipt of the first wink message, wherein the receiving device is one of the wireless devices;
    selecting the first wireless device;
    transmitting the first wink message to the first wireless device;
    receiving location information for the first wireless device from a location database, wherein the location information identifies the location of the first device; and
    storing location associating information with the first wireless device in response to the visual indicator.

2. The method of claim 1, further comprising:
    selecting the second wireless device;
    generating a second wink message, wherein the second wink message comprises instructions for the receiving device to provide a visible indicator of receipt of the second wink message;
    transmitting the second wink message to the second wireless device;
    receiving location information from the location database for the second wireless device; and
    associating the location information with the second wireless device.

3. The method of claim 1, wherein the first device information uniquely identifies the first device.

4. The method of claim 1, wherein the first device information identifies a function of the first device.

5. The method of claim 1, wherein the device query is broadcast via a directional antenna.

6. The method of claim 1, further comprising rebroadcasting the device query at a second power based on the received query responses.

7. A commissioning devices comprising:
an antenna configured to broadcast and receive information;
a processor, wherein the processor is configured to:
- generate a device query, wherein the device query comprises a request for device information;
- broadcast the device query at a first power level, wherein the first power level is a minimum power level;
- receive a first query response comprising first device information for a first wireless device within a network of wireless devices, wherein the first device information identifies an aspect of the first wireless device;
- receive a second query response comprising second device information for a second wireless device within a network, wherein the second device information identifies an aspect of the second wireless device;
- generate a first wink message, wherein the first wink message comprises instructions for a receiving device to provide a visible indicator of receipt of the first wink message, wherein the receiving device is one of the wireless devices;
- select the first wireless device;
- transmit the first wink message to the first wireless device; and
- receive location information from a location database for the first wireless device, wherein the location information identifies the location of the first wireless device; and
- request storing of information associating the location information with the first wireless device in response to the visual indicator; and memory configured to store information associating the location information with the first wireless device.

8. The device of claim 7, wherein the processor is configured to:
- select the second wireless device;
- generate a second wink message, wherein the second wink message comprises instructions for the receiving device to provide a visible indicator of receipt of the second wink message;
- transmit the second wink message to the second wireless device;
- receive location information from the location database for the second wireless device from the second wireless device; and
- associate the location information with the second wireless device.

9. The device of claim 7, wherein the first device information uniquely identifies the first device.

10. The method of claim 7, wherein the first device information identifies a function of the first device.

11. The method of claim 7, wherein the antenna is a directional antenna.

12. The device of claim 7, wherein the processor is configured to rebroadcast the device query at a second power based on the received query responses.

* * * * *